US006570535B1

(12) United States Patent

Stevens et al.

(10) Patent No.: US 6,570,535 B1
(45) Date of Patent: May 27, 2003

(54) SINGLE-RECEIVER MULTIPLE-ANTENNA RF AUTOTRACK CONTROL

(75) Inventors: Homer D. Stevens, Redwood City, CA (US); Keith Reckdahl, Palo Alto, CA (US); Xenophon Price, Redwood City, CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 10/097,678

(22) Filed: Mar. 13, 2002

(51) Int. Cl.[7] .......................... H01Q 3/00; H04B 7/185; G01S 3/28; G01S 5/02

(52) U.S. Cl. ....................... 342/359; 342/354; 342/380; 342/383; 342/427

(58) Field of Search ................................ 342/359, 354, 342/380, 383, 427

(56) References Cited

U.S. PATENT DOCUMENTS 5,594,460 A * 1/1997 Eguchi ....................... 342/359
5,940,034 A * 8/1999 Leung ........................ 342/359

* cited by examiner

*Primary Examiner*—Thomas H. Tarcza
*Assistant Examiner*—Fred H Mull
(74) *Attorney, Agent, or Firm*—Kenneth W. Flost

(57) ABSTRACT

A system and method for RF autotracking multiple antennas (preferably located on a spacecraft) to compensate for disturbances experienced by the antennas. The system and method estimate high frequency errors associated with all of the antennas. The high frequency errors may be estimated using a currently selected antenna and a high-pass filter. The high frequency errors may be estimated using a sensor mounted on the spacecraft, such as a gyro or star tracker, or may be estimated using information, such as planned thruster firings, for example, from a spacecraft attitude control system. Alternatively, the high frequency information may be estimated using any combination of data from these sources. Low frequency errors are estimated using measurements from each selected antenna. The algorithm implemented in the present invention explicitly accounts for the frequency content of each disturbance source. The present invention only requires sampling from one antenna at any one time, reducing the necessary hardware to only one RF receiver.

18 Claims, 2 Drawing Sheets

SINGLE-RECEIVER MULTIPLE-ANTENNA RF AUTOTRACK CONTROL

BACKGROUND

The present invention relates generally to spacecraft communication systems and methods, and more particularly, to a single-receiver, multiple-antenna RF autotrack control system and method for precision pointing of multiple antennas to compensate for disturbances, such as those experienced by a spacecraft.

The assignee of the present invention manufactures and deploys communication satellites or spacecraft that use multiple communication antennas. RF autotracking systems have heretofore generally been used to steer individual antennas to compensate for disturbances to the spacecraft. Typically, only single control algorithms were used to steer an antenna. Sensing and actuation occurred at a high rate to compensate for the fastest disturbance, such as spacecraft motion, which typically affect all the antennas on the spacecraft in the same manner.

In certain prior systems that provide for RF autotrack control of multiple antennas, each antenna utilized a single control algorithm and a dedicated set of sensors to compensate for the most rapid disturbance. As the number of antennas increases, a dedicated sensing system for each antenna becomes prohibitive due to cost and mass.

To overcome the limitations of the above-mentioned prior art systems, U.S. Pat. No. 5,940,034 assigned to the assignee of the present invention discloses an autotrack control scheme that uses two or more receivers to provide RF autotrack control of multiple antennas. This control scheme uses two control algorithms and sums the result for each antenna that is tracked. One control algorithm corrects for rapid, common mode disturbances such as spacecraft motion disturbances, while the other control algorithm corrects for individual disturbances, such as thermal distortion, that do not affect all antennas in the same manner. The present invention provides for an improvement over the teachings of U.S. Pat. No. 5,940,034.

Thus, the most relevant prior art method for autotracking multiple antennas requires a separate tracking receiver for each autotracked antenna. The teachings of U.S. Pat. No. 5,940,034 disclose a method for reducing the amount of hardware by using two receivers, one of which is connected to a dedicated antenna while the other is switched between the remaining antennas (referred to as the multiplexed antenna). This allows the dedicated antenna to sense common disturbances while unique disturbances, such as thermal distortion, are sensed by the individual antennas.

It would therefore be desirable to have an autotrack control system for use with multiple antennas that has reduced hardware requirement. Accordingly, it is an objective of the present invention to expand upon and generalize the prior art concepts, enabling implementations with significantly less hardware. Taken to the logical conclusion, these concepts provide for a single-receiver, multiple-antenna RF autotrack control system and method for autotracking multiple antennas to compensate for disturbances, such as those experienced by a spacecraft.

SUMMARY OF THE INVENTION

To accomplish the above and other objectives, the present invention further reduces the hardware requirements compared to the teachings of U.S. Pat. No. 5,940,034. This is achieved by using frequency domain concepts to develop new insight into the problem and new techniques for solving the problem.

An exemplary embodiment of the RF autotrack control system comprises a plurality of RF feeds or feed arrays (sensors) coupled by way of an input multiplexer to a pseudo-monopulse coupler and tracking receiver. The plurality of sensors collect or sense RF energy derived from a plurality of antennas. The output of the receiver is input to a high pass filter and to an output multiplexer.

Outputs of the output multiplexer are respectively coupled to a plurality of low pass filters associated with a corresponding plurality of antennas. Outputs of the plurality of low pass filters are input to first inputs of a plurality of summing devices. The output of the high pass filter is input to second inputs of the plurality of summing devices. The outputs of the summing devices comprise a plurality of net error signals that are coupled to a plurality of control algorithms and antenna steering mechanisms associated with the plurality of antennas.

The pseudo-monopulse coupler and tracking receiver outputs azimuth and elevation error signals associated with the antennas. The output of the high pass filter comprises the high frequency portion of this error signal detected by the sensor. This high frequency information is assumed to be common for all controlled antennas (i.e., represents spacecraft motion).

The concept implemented by the present invention thus estimates the high frequency (or "fast") errors using the currently selected antenna and a high-pass filter. Alternatively, the high frequency errors may be estimated using a sensor mounted on the spacecraft, such as a gyro or star tracker. Alternatively, the high frequency errors may be estimated using information from the spacecraft bus attitude control system such as planned thruster firings, for example. Alternatively, the high frequency information may be estimated using any combination of data from the above sources. The low frequency (or "slow") errors are estimated using measurements from each selected antenna.

The high frequency signal is combined with the low frequency signal for each antenna, and the resulting full spectrum signal is used by a control algorithm to command each antenna pointing mechanism. Thus, the algorithm implemented in the present invention explicitly accounts for the frequency content of each disturbance source.

Unlike the teachings of U.S. Pat. No. 5,940,034, which requires simultaneous sampling from two or more antennas, the present invention only requires sampling from one antenna at any one time, reducing the necessary hardware to only one RF receiver. The present invention generalizes and expands upon the prior art by using a single controller with two signal paths, the high frequency path, representing disturbances that are common to all of the antennas, and a low frequency signal, which enables the controller to estimate the orientation of each individual antenna relative to the high frequency sensor. The two signal paths are combined using the concept of complimentary filter design.

The resulting system can use any source for the high frequency signal including an inertial measurement unit (or gyro), a second RF sensor (as in the prior art), or the currently selected antenna. In addition, information from the spacecraft body attitude control system can be used to augment the sensed high frequency signal, enabling more precise control in the case of a single receiver implementation.

It is to be noted that, by changing the source for the high frequency data to a dedicated antenna, the present generalized algorithm may be reduced to the prior art implementation as a special case.

Although the present invention reduces the required hardware, it requires more complexity in the control system design and control system software. The teachings of U.S. Pat. No. 5,940,034 provide for simple switching between the available signals, while the present invention combines and filters the signals. The design of these filters requires significant frequency-domain knowledge, which complicates the design process.

The present invention enables precision pointing of multiple antennas while requiring only one RF receiver. The present invention has lower cost, less mass, less on-board hardware, and better reliability compared to other prior approaches.

An exemplary embodiment of the RF autotrack control method involves the following steps. RF energy derived from a plurality of antennas is sensed by a plurality of RF sensors. The sensed RF energy is processed to generate pointing error signals (azimuth and elevation pointing errors). The pointing error signals are filtered by a high pass filter, and are also filtered by a plurality of low pass filters associated with each of the plurality of antennas. The respective filtered signals are combined to generate a plurality of net error control signals comprising compensation signals or commanded steps. The net error control signals or command steps are applied to the selected antenna to correct pointing errors associated with the selected antenna.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
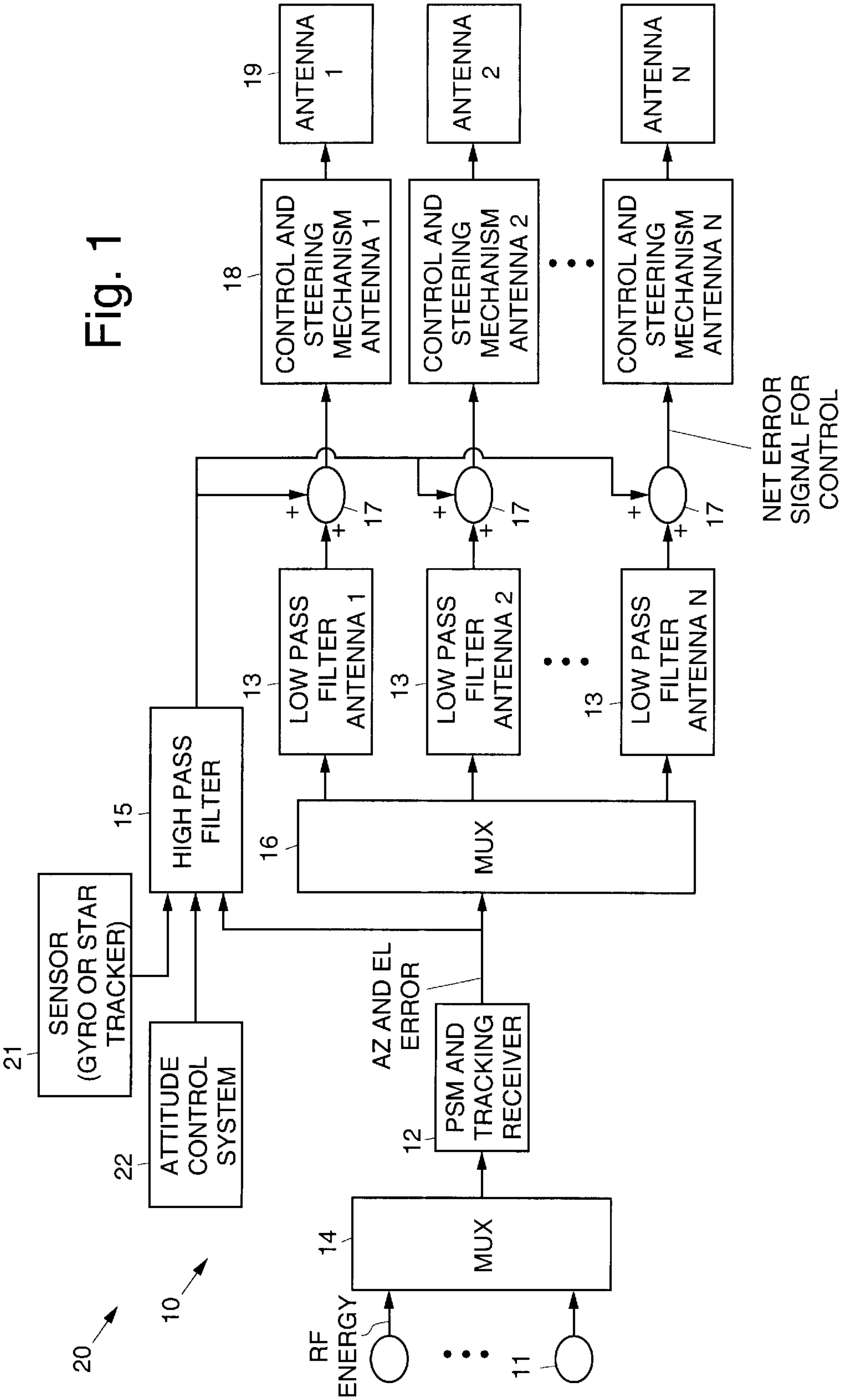
FIG. 1 illustrates a block diagram of an exemplary single-receiver, multiple-antenna RF autotrack control system in accordance with the principles of the present invention.

Referring to the drawing figures, FIG. 1 illustrates a block diagram of an exemplary single-receiver, multiple-antenna RF autotrack control system 10 in accordance with the principles of the present invention that may be employed on a spacecraft 20, for example. The autotrack control system 10 comprises a plurality of RF feeds 11 or feed arrays 11 (sensors 11) coupled by way of an input multiplexer 14 to a pseudo-monopulse (PSM) coupler and tracking receiver 12. The plurality of RF feeds 11 or feed arrays 11 collect RF energy derived from a plurality of antennas 19. The output of the pseudo-monopulse coupler and tracking receiver 12 is input to a high pass filter 15 and to an output multiplexer 16.

Outputs of the output multiplexer 16 are respectively coupled to a plurality of low pass filters 13 associated with a corresponding plurality of antennas 19. Outputs of the plurality of low pass filters 13 are input to respective first inputs of a plurality of summing devices 17. The output of the high pass filter 15 is input to respective second inputs of the plurality of summing devices 17. The respective outputs of the summing devices 17 provide a respective plurality of net error control signals. The respective outputs of the summing devices 17 (the net error control signals) comprise compensation signals (commanded steps) that are coupled to a plurality of control and steering mechanisms 18 associated with the plurality of antennas 19.

The pseudo-monopulse coupler and tracking receiver 12 outputs azimuth and elevation error signals associated with the antennas 19. The output of the high pass filter 15 comprises commanded steps (correction signals) that correct the errors detected by the RF sensor 11. These commanded steps track out the common mode error, such as motion of the spacecraft 20 that affects all of the antennas 18 as well as the non-common mode errors that affect the antenna 18 sensed by the dedicated RF sensor 11.

The autotrack control system 10 is designed to control and eliminate pointing errors resulting from common mode and non-common mode disturbances experienced by the antennas 18. In the context of the present invention, non-common mode disturbances are typically slower than common mode disturbances. The autotrack control system 10 does this using a single receiver 12.

The autotrack control system 10 estimates “fast” (high frequency) errors using a currently selected antenna 19 and the high-pass filter 15. The “slow” (low frequency) errors are estimated using measurements from each selected antenna 19. This algorithm implemented in the autotrack control system 10 explicitly accounts for the frequency content of each disturbance source. Unlike the teachings of U.S. Pat. No. 5,940,034, which requires simultaneous sampling from two or more antennas, the autotrack control system 10 only requires sampling from one antenna 19 at any one time, reducing the necessary hardware to only one RF receiver 12.

Figure 2:
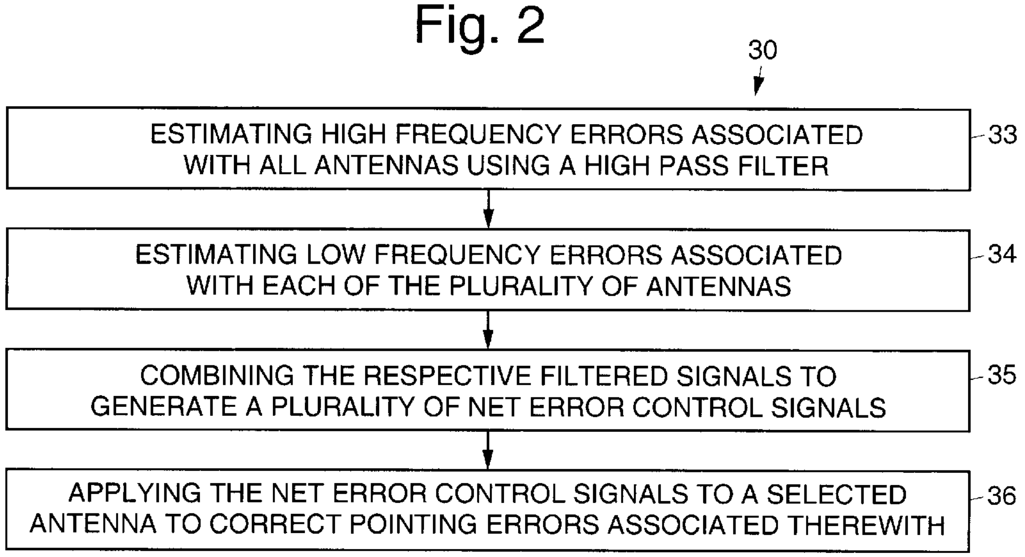
FIG. 2 is a flow diagram that illustrates a generalized RF autotracking control method in accordance with the principles of the present invention.

Referring to FIG. 2, it is a flow diagram that illustrates a generalized RF autotracking control method in accordance with the principles of the present invention. In general, the method 30 comprises the following steps. High frequency errors associated with all antennas are estimated 33 (using a high pass filter 15). Low frequency errors associated with each respective antenna are estimated 34. The respective filtered signals are combined 35 to generate a plurality of net error control signals. Respective net error control signals are applied 36 to each corresponding antenna to correct pointing errors associated with the antenna 19.

Figure 3:
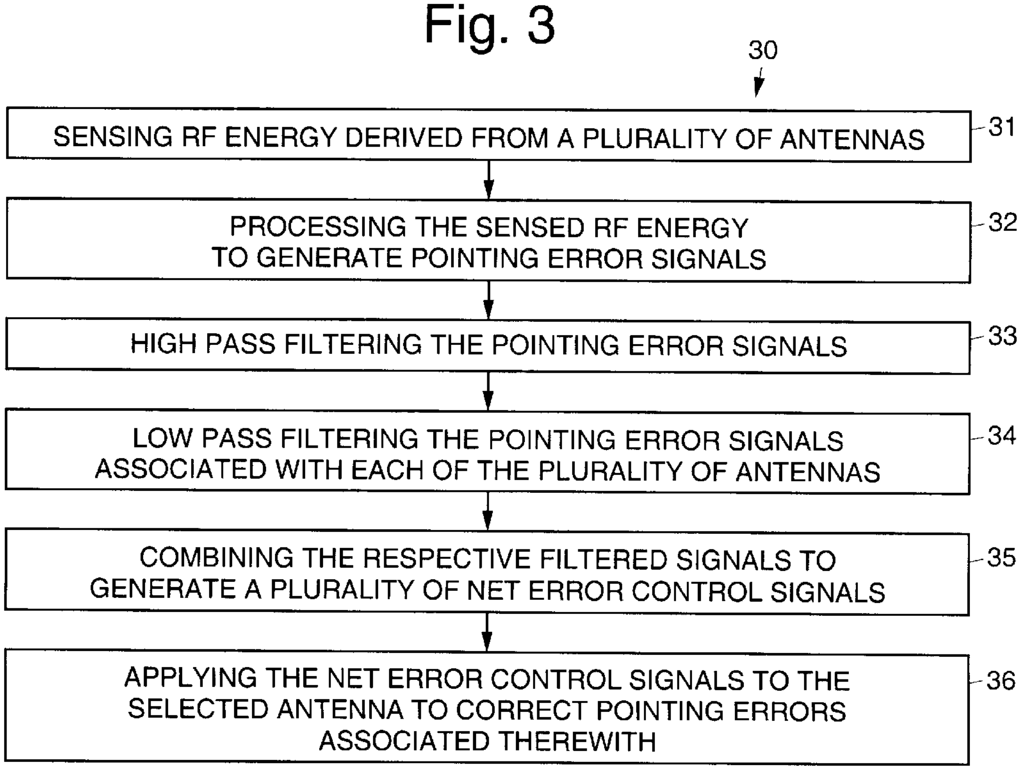
FIG. 3 is a flow diagram that illustrates a specific exemplary RF autotracking control method in accordance with the principles of the present invention.

Referring to FIG. 3, it is a flow diagram that illustrates a specific exemplary RF autotracking method 30 in accordance with the principles of the present invention. The specific RF autotracking method 30 comprises the following steps.

RF energy derived from a plurality of antennas 19 is sensed 31 by a plurality of RF sensors 11. The sensed RF energy is processed 32 to generate pointing error signals (azimuth and elevation pointing errors). The pointing error signals are filtered 33 by a high pass filter 15, and are also filtered 34 by a plurality of low pass filters 13 associated with each of the plurality of antennas 19. The respective filtered signals are combined 35 to generate a plurality of net error control signals comprising compensation signals or commanded steps. The net error control signals or command steps are applied 36 to the selected antenna 19 to correct pointing errors associated with the selected antenna 19.

Alternative embodiments of the autotrack control system 10 and method 30 may readily be employed, such as those that use gyro-based controllers, for example. Furthermore, the high frequency errors may be estimated using a sensor 21 mounted on the spacecraft 20, such as a gyro or star tracker. Alternatively, the high frequency errors may be estimated using information, such as planned thruster firings, for example, from a spacecraft bus attitude control system 22. Alternatively, the high frequency information may be estimated using any combination of data from the above sources. Accordingly, the present invention is not limited only to the use of the RF sensors 11, but provides for the use of any common-mode sensing arrangement.

Thus, a dual RF autotrack control system and method for RF autotracking multiple antennas to compensate for rapidly and slowly varying disturbances, such as those experienced by a spacecraft, have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. An autotrack control system for autotracking multiple antennas to compensate for disturbances thereto, comprising:

apparatus comprising a high pass filter for estimating high frequency errors associated with all antennas;

apparatus for estimating low frequency errors associated with each respective antenna;

apparatus for combining signals comprising the high frequency errors with the low frequency errors produce a full spectrum signal; and a control algorithm for processing the full spetrum signal to command each pointing of each antenna to account for a frequency content of each disturbance source.

2. The system recited in claim 1 wherein the apparatus comprises:

a plurality of RF sensors that sense RF energy derived from the plurality of antennas;

an input multiplexer for multiplexing the sensed RF energy; and a pseudo-monopulse coupler and tracking receiver for processing the sensed RF energy to generate azimuth and elevation error signals associated with each of the antennas.

3. The system recited in claim 1 wherein the apparatus for estimating low frequency errors using measurements from each antenna comprises:

an output multiplexer for separating azimuth and elevation error signals into a plurality of separate error signals associated with each of the antennas; and a plurality of low pass filters associated with respective ones of the antennas for processing the azimuth and elevation error signals for generating low pass filtered error signals associated with each respective antenna.

4. The system recited in claim 1 wherein the apparatus for combining the high frequency signal with the low frequency signal for each antenna to produce a full spectrum signal comprises:

a plurality of summing devices for processing the high pass filtered error signal and the low pass filtered error signals to generate a plurality of net error control signals associated with each respective antenna.

5. The system recited in claim 4 further comprising a plurality of control and steering mechanisms respectively associated with the plurality of antennas for processing the net error control signals to autotrack the antennas.

6. The system recited in claim 4 which is disposed on a spacecraft wherein common mode errors are sensed that comprise perturbations to the motion of the spacecraft that affects all antennas, and wherein non-common mode errors comprise perturbations that affect a selected antenna.

7. The system recited in claim 1 wherein high frequency errors are estimated using a currently selected antenna and the high-pass filter.

8. The system recited in claim 1 which is disposed on a spacecraft.

9. The system recited in claim 8 wherein the high frequency errors are estimated using a sensor mounted on the spacecraft.

10. The system recited in claim 8 wherein the high frequency errors are estimated using information from a spacecraft attitude control system and the high-pass filter.

11. The system recited in claim 8 wherein the high frequency information is estimated using a combination of data selected from a group consisting of a currently selected antenna and the high-pass filter, sensor mounted on the spacecraft, or information from a spacecraft attitude control system.

12. The system recited in claim 8 wherein low frequency errors are estimated using measurements from each selected antenna.

13. A method for autotracking multiple antennas to compensate for disturbances experienced by the antennas, comprising the steps of:

estimating high frequency errors associated with all antennas;

estimating low frequency errors associated with each respective antenna;

combining the respective filtered signals to generate a plurality of net error control signals; and applying respective net error control signals to each corresponding antenna to correct pointing errors associated with the antenna.

14. The method recited in claim 13 wherein the step of estimating high frequency errors comprises the steps of:

sensing RF energy derived from a plurality of antennas;

processing the sensed RF energy to generate azimuth and elevation pointing error signals; and high pass filtering the pointing error signals associated with all antennas.

15. The method recited in claim 13 which is disposed on a spacecraft and which enables precision pointing of the antennas.

16. The method recited in claim 15 wherein the step of estimating high frequency errors comprises the step of:

high pass filtering signals derived from a sensor mounted on the spacecraft.

17. The method recited in claim 15 wherein the step of estimating high frequency errors comprises the step of:

high pass filtering signals using information from a spacecraft attitude control system.

18. A method for autotracking multiple antennas to compensate for disturbances experienced by the antennas, comprising the steps of:

sensing RF energy derived from a plurality of antennas;

estimating high frequency errors for a currently selected antenna using a high-pass filter;

estimating low frequency errors using measurements from each antenna;

combining the high frequency signal with the low frequency signal for each antenna to produce a full spectrum signal; and processing the full spectrum signal using a control algorithm to command pointing of each antenna to account for a frequency content of each disturbance source.

* * * * *